(12) United States Patent
Hernandez Garcia et al.

(10) Patent No.: US 10,088,868 B1
(45) Date of Patent: Oct. 2, 2018

(54) PORTABLE ELECTRONIC DEVICE FOR ACUSTIC IMAGING AND OPERATING METHOD FOR THE SAME

(71) Applicant: Merry Electronics(Shenzhen) Co., Ltd., Shenzhen (CN)

(72) Inventors: Diego Jose Hernandez Garcia, Taichung (TW); Che-Wei Hsu, Taichung (TW); Yi-Lin Hsieh, Taichung (TW); Chih-Hung Lee, Taichung (TW)

(73) Assignee: Merry Electronics(Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/862,647

(22) Filed: Jan. 5, 2018

(51) Int. Cl.
*H05K 7/00* (2006.01)
*G09G 5/00* (2006.01)
*G06F 1/16* (2006.01)
*G06F 3/01* (2006.01)
*G02C 11/00* (2006.01)
*G02B 27/01* (2006.01)

(52) U.S. Cl.
CPC ........... *G06F 1/163* (2013.01); *G02B 27/017* (2013.01); *G02C 11/10* (2013.01); *G06F 3/011* (2013.01)

(58) Field of Classification Search
CPC ........................................................ G06K 9/00
USPC .................................................... 361/679.01
See application file for complete search history.

(56) References Cited

U.S. PATENT DOCUMENTS

2013/0147686 A1* 6/2013 Clavin ................... G06F 3/013
345/8
2013/0187943 A1* 7/2013 Bohn .................. G02B 27/0093
345/619

* cited by examiner

*Primary Examiner* — Jerry Wu
(74) *Attorney, Agent, or Firm* — JCIPRNET

(57) ABSTRACT

A wearable electronic apparatus, a computer-implement operating method for the same, and an electronic system are provided. The method includes receiving a sound, and correspondingly generating a plurality of audio data according to the received sound; determining a relative direction and a relative location of the sound source and the wearable electronic apparatus, and an intensity level of the sound; generating a computer-generated visual content corresponding to the sound according to the relative direction, the intensity level of the sound, and the relative location; and displaying the generated computer-generated visual content corresponding to the sound on a transparent lens of the display device of the wearable electronic apparatus.

16 Claims, 14 Drawing Sheets

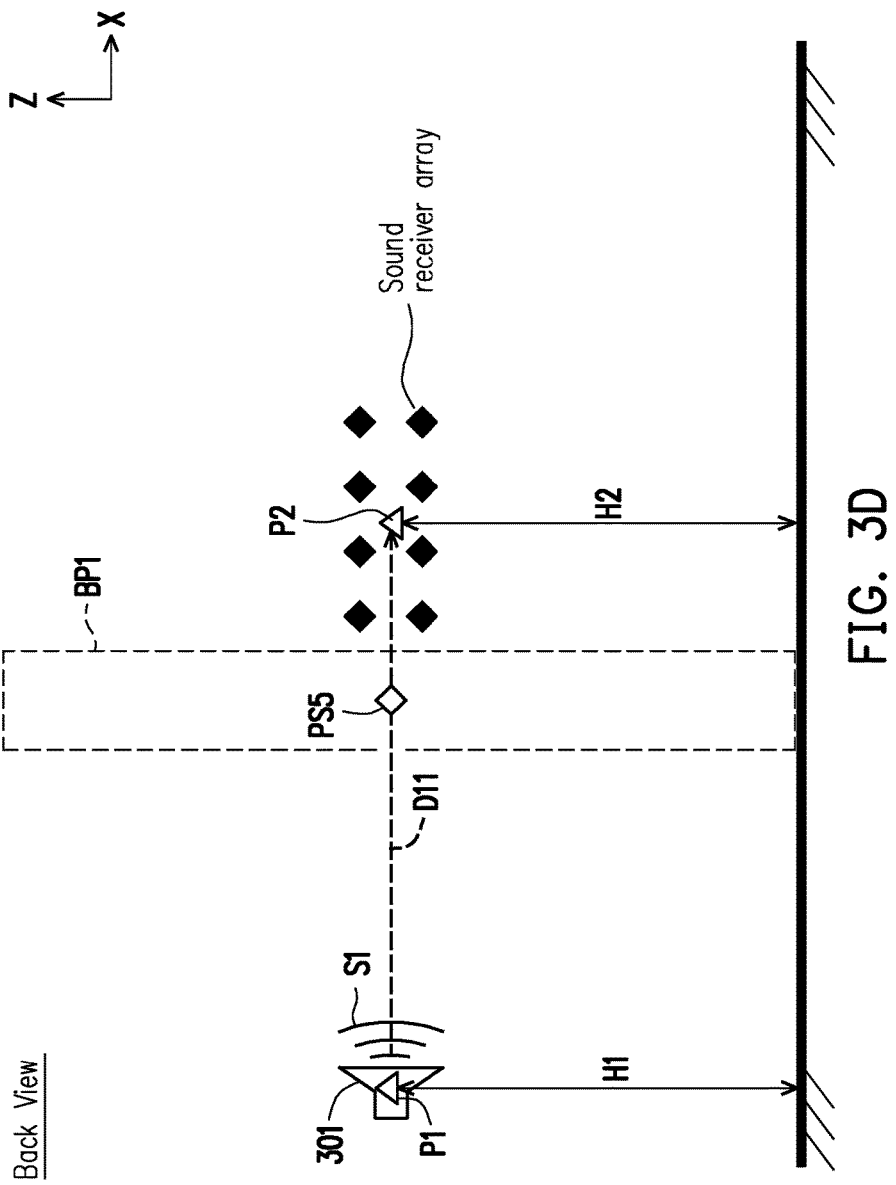

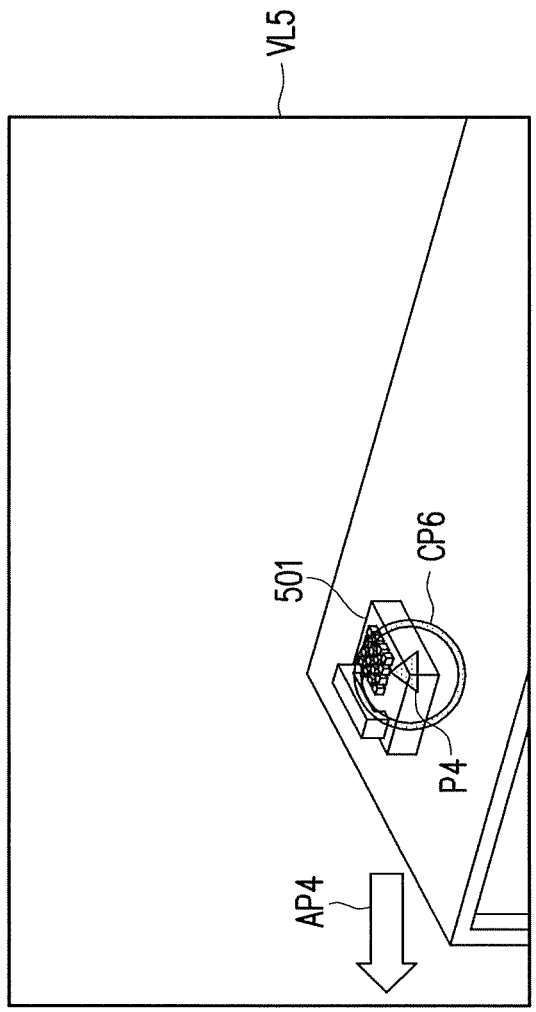

PORTABLE ELECTRONIC DEVICE FOR ACUSTIC IMAGING AND OPERATING METHOD FOR THE SAME

BACKGROUND OF THE INVENTION

1. Field of the Invention

The disclosure relates to a wearable electronic apparatus, and an operating method for the same, and more particularly to a wearable electronic apparatus comprising a head-mounted display and a plurality of sound receivers, and an operating method for the same.

2. Description of Related Art

Augmented reality is used to combine the real environment with virtual information generated by computer. Augmented reality glasses incorporate transparent displays (e.g., a transparent lens which can display computer-generated image/video) to add the visual information on the view of the person who is wearing them.

SUMMARY OF THE INVENTION

A wearable electronic apparatus, a computer-implement operating method, and an electronic system provided by the presented invention are capable of receiving a sound which is made by a nearby sound source, analyzing audio data corresponding to the received sound, and accordingly generating and displaying an acoustic image corresponding to a received sound, so as to informing an intensity of the sound and a relative direction of the sound through the displayed acoustic image.

According to a concept of the present invention, a wearable electronic apparatus is provided. The wearable electronic apparatus includes a front frame, a side frame, a display device including a transparent lens, a sound receiver array including a plurality of sound receiver disposed on the front frame and the side frame, and a controller. The display device is configured to display a visual content on the transparent lens, wherein a real-world scene is seen by the wearer through the lens. The sound receiver array is configured to receive a sound made by a sound source around the wearable electronic apparatus, and correspondingly generate a plurality of audio data according to the received sound. The controller coupled to the display device and the sound receiver array, and configured to perform an analysis to the audio data to determine a relative directions and a relative locations of the sound sources and the wearable electronic apparatus, and to determine an intensity level of the sound. Furthermore, the controller is further configured to generate a computer-generated visual content (e.g., an acoustic image) corresponding to the sound according to the relative direction, the intensity of the sound, and the relative location. The display device is configured to display the generated computer-generated visual content corresponding to the sound on the lens, such that a view via the lens (view-via-lens) is captured by a wearer's visual perception, wherein the view-via-lens comprises the computer-generated visual content displayed on the lens and the view-via-lens seen by the wearer through the lens.

According to yet another concept of the present invention, a computer-implement operating method is provided. The method includes receiving a sound made by a sound source around an electronic apparatus by a sound receiver array of the electronic apparatus, and correspondingly generating, by the sound receiver array, a plurality of audio data according to the received sound; performing, by a controller of the wearable electronic apparatus, an analysis to the audio data to determine a relative direction and a relative location of the sound source and the wearable electronic apparatus, to determine an intensity level of the sound; generating, by the controller, a computer-generated visual content corresponding to the sound according to the relative direction, the intensity level of the sound, and the relative location; and displaying, by a display device of the wearable electronic apparatus, the generated computer-generated visual content corresponding to the sound on a transparent lens of the display device, wherein a real-world scene is seen by the wearer through the lens, such that a view via the lens (view-via-lens) is captured by a wearer's visual perception, wherein the view-via-lens comprises the computer-generated visual content displayed on the lens and the real-world scene seen by the wearer through the lens.

Based on the foregoing embodiment, the provided wearable electronic apparatus, computer-implement operating method for the same, and the electronic system are capable of receiving a sound which is made by a nearby sound source, analyzing audio data corresponding to the received sound, and accordingly generating and displaying an acoustic image corresponding to a received sound, so as to informing an intensity of the sound and a relative direction/position of the sound through the acoustic image (the computer-generated visual content) displayed on the view-via-lens or the captured image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3D shows schematic diagram of generating another first computer-generated visual content corresponding to the sound of the sound source in FIG. 3A according to an embodiment of the invention.

FIG. 5B shows a schematic diagram of a view-via-lens having a computer-generated visual content and a second computer-generated visual content respectively corresponding to different sounds according to an embodiment of the invention.

DESCRIPTION OF THE EMBODIMENTS

Figure 1A:
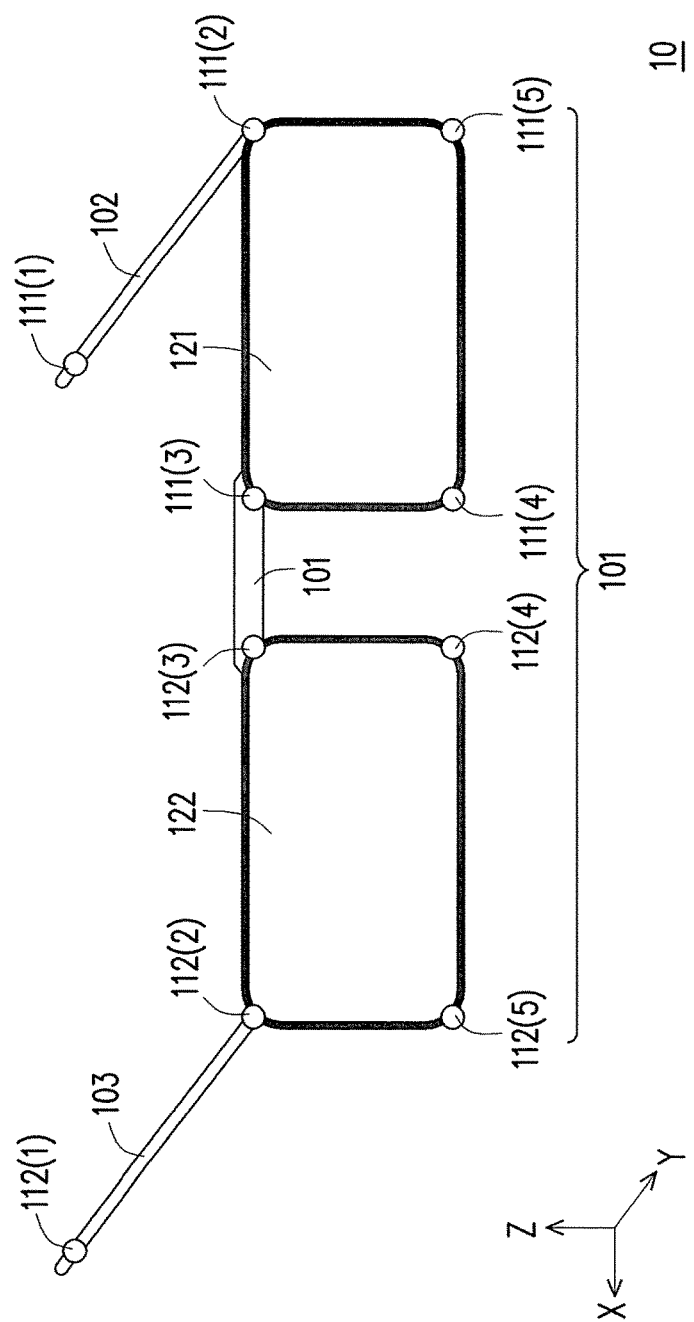
FIG. 1A shows a schematic diagram of a wearable electronic apparatus according to an embodiment of the invention.
Figure 1B:
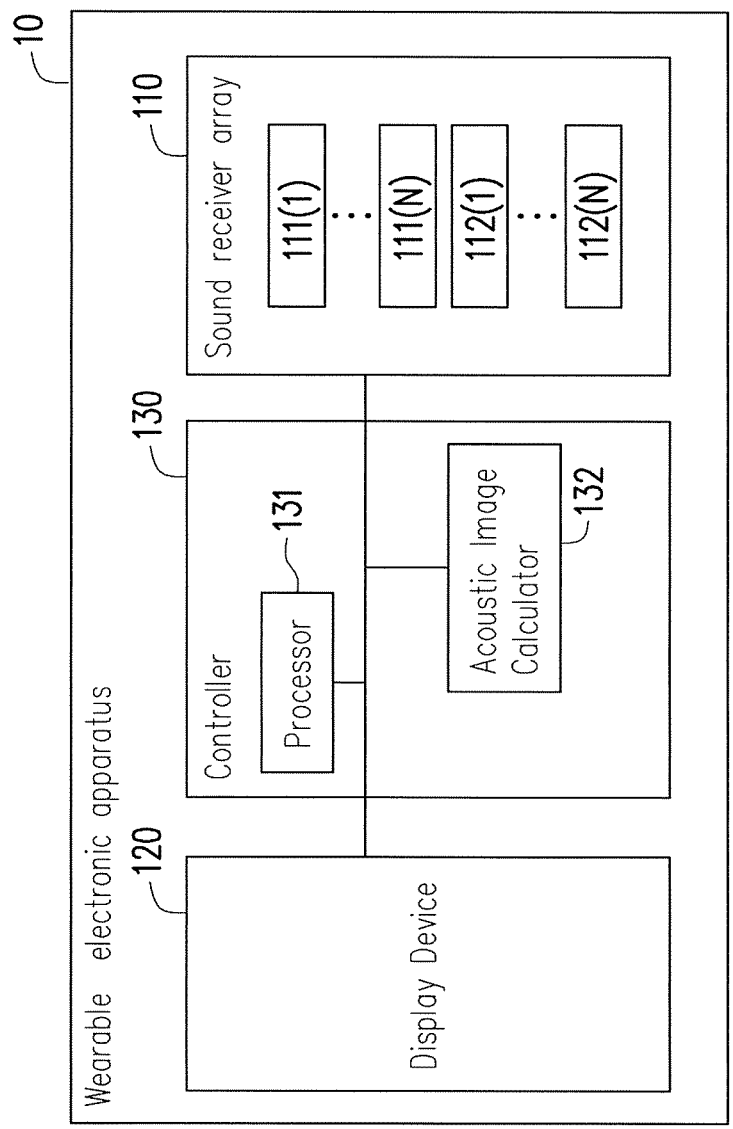
FIG. 1B shows a block diagram of a wearable electronic apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The proposed invention is a wearable electronic apparatus that incorporates a plurality of sound receivers (e.g., microphones) and transparent display. The wearable electronic apparatus is worn in a similar manner as eyeglasses, a helmet, a VR glasses, AR glasses, etc. By using the audio data (signals) simultaneously acquired by the microphones and beamforming technique, the information of the sound source(s) (the computer-generated visual content or acoustical image) may be represented on the transparent display.

Referring to FIG. 1A, In the embodiment, assuming a user wears the wearable electronic apparatus 10, and the direction from the back side to the front side of the wearer/wearable electronic apparatus corresponds a Y coordinate axis (also referred to as Y direction) of the orthogonal coordinate system, the direction from the left side to the right side of the wearer/wearable electronic apparatus corresponds a X coordinate axis (also referred to as X direction), and the direction from the bottom side to the top side of the wearer/wearable electronic apparatus corresponds a Z coordinate axis (also referred to as Z direction) of the orthogonal coordinate system.

The wearable electronic apparatus 10 includes a front frame 101 and side frames 102 and 103, wherein a first end of the side frame 102 and a first end of the side frame 103 are respectively connected to two sides of the front frame 101 as illustrated in FIG. 1A. In another embodiment, a second end of side frame 102 may be directly connected to a second end of the side frame 103.

The wearable electronic apparatus 10 further includes a sound receiver array 110 which includes a plurality of sound receivers 111(1) to 111(N) and 112(1) to 112(N) disposed on the front frame 101 and the side frames 102 and 103. N may be a positive integer equal to or larger than 2. For example, sound receiver 111(1) is disposed on (the second end of) the side frame 102 (left side frame), sound receivers 111(2)-111(5) are equally disposed on corners of one part (left part) of the front frame 101, sound receiver 112(1) is disposed on (the second end of) the side frame 103 (right side frame), and sound receivers 112(2)-112(5) are equally disposed on corners of another part (right part) of the front frame 101. It should be mentioned that the arrangement of the sound receivers is only utilized an illustrated, the exemplary embodiment is not intended to limit the number of the sound receivers. In some exemplary embodiments, one or more sound receivers may be added between every two sound receivers illustrated in FIG. 1A according to actual needs. In the embodiment, the sound receiver, for example, may be a microphone or other types of transducers which may receive (detect) sound(s) made around the wearable electronic apparatus 10. Each of the sound receivers (sound receiver array) may generate an audio data according to the received sound.

The wearable electronic apparatus 10 further includes a controller 130 and a display 120, wherein the controller includes a processor 131 and an acoustic image calculator 132, and the controller 130 is coupled to the display 120 and the sound receiver array 110.

In the embodiment, the processor 131 may include central processing units (CPUs) of the wearable electronic apparatus 10 and, thus, control the overall operation of wearable electronic apparatus 10. In certain embodiments, the processor 131 accomplishes this by loading software or firmware stored in a non-transitory computer readable recording medium (or other storage device/circuit), and executing the software or firmware thereof (e.g., the processor 131 is programmed), so as to implement the operating method provided in the embodiment as well. The processor 131 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In the embodiment, the acoustic image calculator 132 is a circuit(s) or chip(s) which is programmed by one or more algorithms/methods (e.g., a Beamforming, Angle of Arrival (AoA), Time Difference of Arrival (TDOA), Frequency Difference of Arrival (FDOA), or other similar associated techniques and algorithms/methods thereof) to calculate a direction of arrival (DOA) corresponding to a sound made by a sound source by inputting an audio data (or sound signal) generated according to the sound. For example, sound receiver 111(1) receives a sound, and correspondingly generates audio data of the received sound. Next, the sound receiver 111(1) transmits the audio data to the acoustic image calculator 132 of the controller 130. The audio data is inputted into the acoustic image calculator 132 and a direction of arrival corresponding to the sound received by the sound receiver 111(1) is outputted from the acoustic image calculator 132 by calculating operation thereof. The acoustic image calculator 132 may transmit the direction of arrival corresponding to the sound received by the sound receiver 111(1) to the processor 131. The direction of arrival (DOA) corresponding to a sound received by the sound receiver 111(1) provides spatial information about the direction (relative to the sound receiver which receives the sound) where the sound comes from. The spatial information provided by the DOA may be a direction vector in the orthogonal coordinate system (a 3D direction vector).

The display device 120 includes one or more transparent lenses (e.g., lens 121 and lens 122). The lenses may be disposed on the hollow areas of the front frame 101. In the embodiment, the wearer's sight may pass through the transparent lenses and see a scene of the real world through the lenses (i.e., a view-via-lens). In other words, a real-world scene through the lenses may be captured by the wearer's visual perception. The display device 120 is configured to render a visual content on a display surface of the transparent lenses in a manner of directly transmitting image signals of the visual content to the lenses to make the lenses itself to display the visual content according to the image signals. The lenses, for example, may be a transparent organic light-emitting diode (OLED) display panel, active matrix organic light-emitting diode (AMOLED) display panel, Field Sequential liquid crystal display (FS-LCD) panel, or thin-film transistor liquid crystal display (TFT-LCD) panel. The view-via-lens is for indicating all the visual image which is seen by the wearer through the lenses (e.g., including a real-world scene and a visual content rendered on the display surface).

In another embodiment, the display device 120 is configured to render the visual content on the lenses in a manner of projecting an image of the visual content onto the display surface of the lenses which may contain a transparent reflect layer which would reflect the projected image of the visual content.

In an embodiment, the lenses may include, for example, a resistive touch sensor, a capacitive touch sensor, and/or other suitable types of touch sensor configured to detect a touch operation (action) performed on the lenses.

Figure 2:
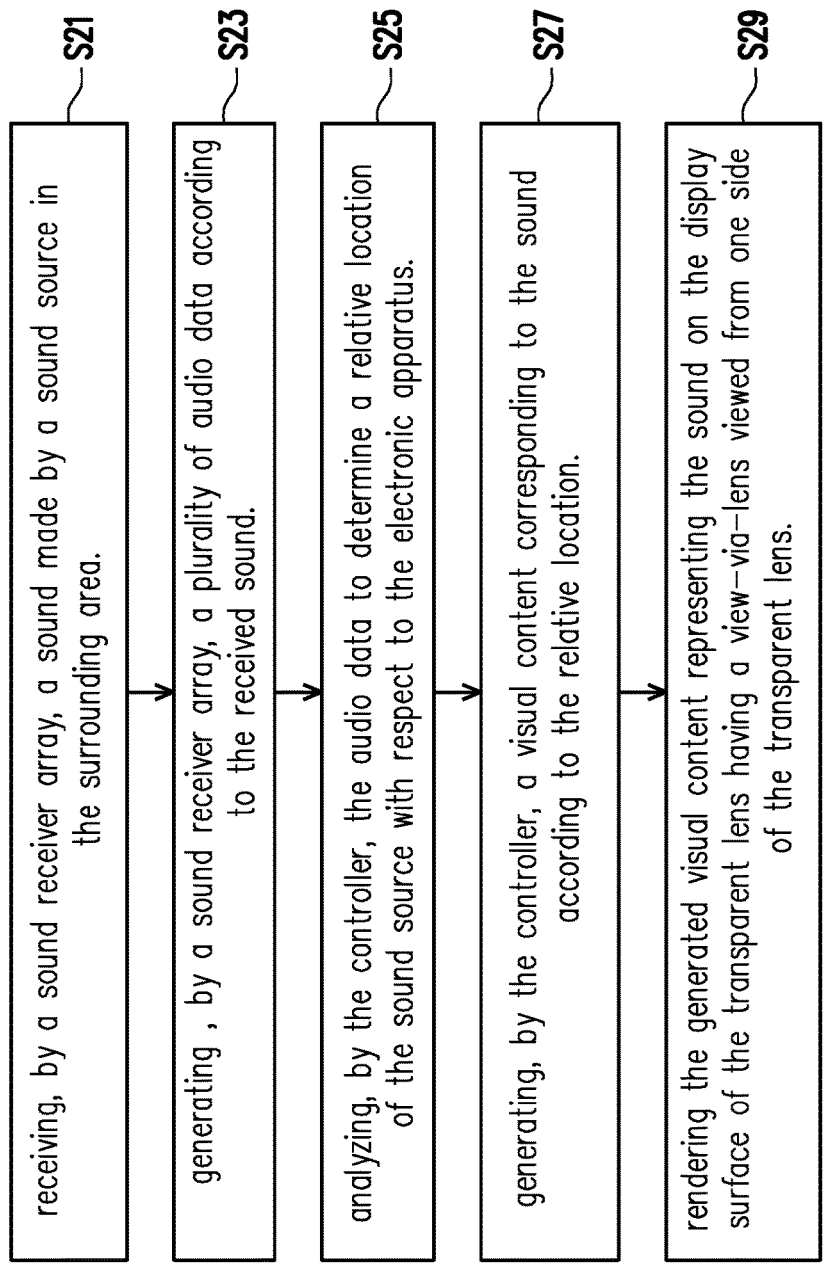
FIG. 2 shows a flow chart of a computer-implement operating method according to an embodiment of the invention.

Referring to FIG. 2, in step S21, the sound receiver array receives a sound made by a sound source around an electronic apparatus 10 by a sound receiver array 110 of the electronic apparatus 10. For example, referring to FIG. 3A, a speaker (which is around the wearable electronic apparatus 10) makes a sound S1 (output a sound S1), and the sound receiver array (each of the sound receivers) detect (receives) the sound. Next, in step S23, the sound receiver array generates a plurality of audio data according to the received sound. Specifically, each of the sound receivers of the sound receiver array receives the sound S1, and generates audio data (also referred to as audio signals or sound signals) according to the received sound of which the sound pressure or other acoustic parameter(s) may not be the same. Then, the sound receiver array 110 may transmit a plurality of audio data generated by different sound receivers to the controller 130.

In step S25, the controller 130 performs an analysis to the plurality of audio data to determine a relative direction of the sound source and the electronic apparatus, to determine an intensity level of the sound, and to determine a relative location of the sound source and the electronic apparatus according to the relative direction.

Specifically, In the embodiment, the acoustic image calculator 132 receives the plurality of audio data respectively generated by the sound receivers 111(1) to 111(5) and 112(1) to 112(5) in response to the respectively received sounds, and the acoustic image calculator 132 may perform a DOA calculation to each of the audio data to obtain a plurality of DOA data respectively corresponding to the plurality of audio data (obtaining one DOA data from one audio data by performing the DOA calculation to the one audio data). For one of the plurality DOA data, it includes spatial information such as a direction vector indicating a 3D direction from the position of the sound source of the sound to the position of the sound receiver which provides the audio data corresponding to the one DOA data.

For example, the acoustic image calculator 132 performs a DOA calculation to audio data (also referred to as audio data S1_111(1)) generated from a sound S1 (also referred to as sound S1_111(1)) received by the microphone 111(1), and then a DOA data (also referred to as DOA data S1_111(1) or DOA data 111(1)_S1) is outputted through the performed DOA calculation. The DOA data S1_111(1) may be a relative 3D direction vector which starts from a position of the sound source 301 to a position of the sound receiver 111(1); the DOA data 111(1)_S1 may be a relative 3D direction vector which starts from a position of the sound receiver 111(1) to a position of the sound source 301 of the sound S1. The acoustic image calculator 132 may send the calculated plurality of DOA data to the processor for further analysis.

The processor 131 may analyze the plurality of DOA data corresponding to the sound of the sound source to determine a relative direction (an overall relative direction vector) of the sound source and the wearable electronic apparatus. In more detail, the processor 131 may calculate a relative direction between the position of the sound source and the position of a reference point of the wearable electronic apparatus according to the plurality of DOA data corresponding to the sound of the sound source.

Furthermore, the processor 131 may analyze the plurality of DOA data corresponding to the sound of the sound source to determine a relative location (an overall relative coordinate) of the sound source and the wearable electronic apparatus. In more detail, the processor 131 may calculate a relative location between the position(coordinate) of the sound source and the position(coordinate) of a reference point of the wearable electronic apparatus according to the plurality of DOA data corresponding to the sound of the sound source.

In the embodiment, the processor 131 may analyze the plurality of audio data to determine an intensity level of the sound. Furthermore, only if the determined intensity level of the sound is larger than an intensity threshold, the processor 131 would start to perform the step S27, so as to prevent generating the visual content corresponding to small background noises received by the sound receiver array 110. Moreover, in an embodiment, the controller 130 further includes an audio filter, and the audio data will be filtered by the audio filter to prevent the generated audio data from being influenced by a voice of the wearer and a spatial aliasing. In other words, the sound receiver array may eliminate the voice of the wearer (not to receive the voice of the wearer) via the audio filter.

In an embodiment, audio filters are used in order to focus the sound in a desire frequency band. For example, a speech audio filter focuses on sounds having 1 KHz to 2 KHz frequency.

In step S27, the controller 130 generates a computer-generated visual content corresponding to the sound according to the relative direction, the intensity level of the sound, and the relative location. Specifically, the processor 131 may generate different types of the computer-generated visual contents (e.g., a first computer-generated visual content and a second computer-generated visual content) by determining (estimating) whether an image of the sound source would be seen by the wearer (i.e., by determining whether the image of the sound source is within a view of the wearer through the lens) according to the relative direction and the relative location. The size or the color of the computer-generated visual content may be configured to adapt to different intensity levels of the sound. The measuring unit of the intensity of the sound may be, for example, "Pa" or "dB". More detail of the different types of the computer-generated visual contents would be described with following FIGS. 3A to 3E and 4A to 4C.

Next, in step S29, the display device renders the generated computer-generated visual content corresponding to the sound on the transparent lens of the display device, wherein a view-via-lens is seen by the wearer of the wearable electronic apparatus through the lens from one side of the lens.

Specifically, after generating the computer-generated visual content (image/video) corresponding to the sound, the processor 131 transmits it to the display device 120, and the display device 120 renders the computer-generated visual content representing the sound on the lens, such that a view-via-lens is captured by a wearer's visual perception, wherein the view-via-lens comprises the computer-generated visual content displayed on the lens and the real-world scene seen by the wearer through the lens (i.e., the wearer would see the computer-generated visual content displayed on the lens and a scene of real world in front of the lens).

Figure 3A:
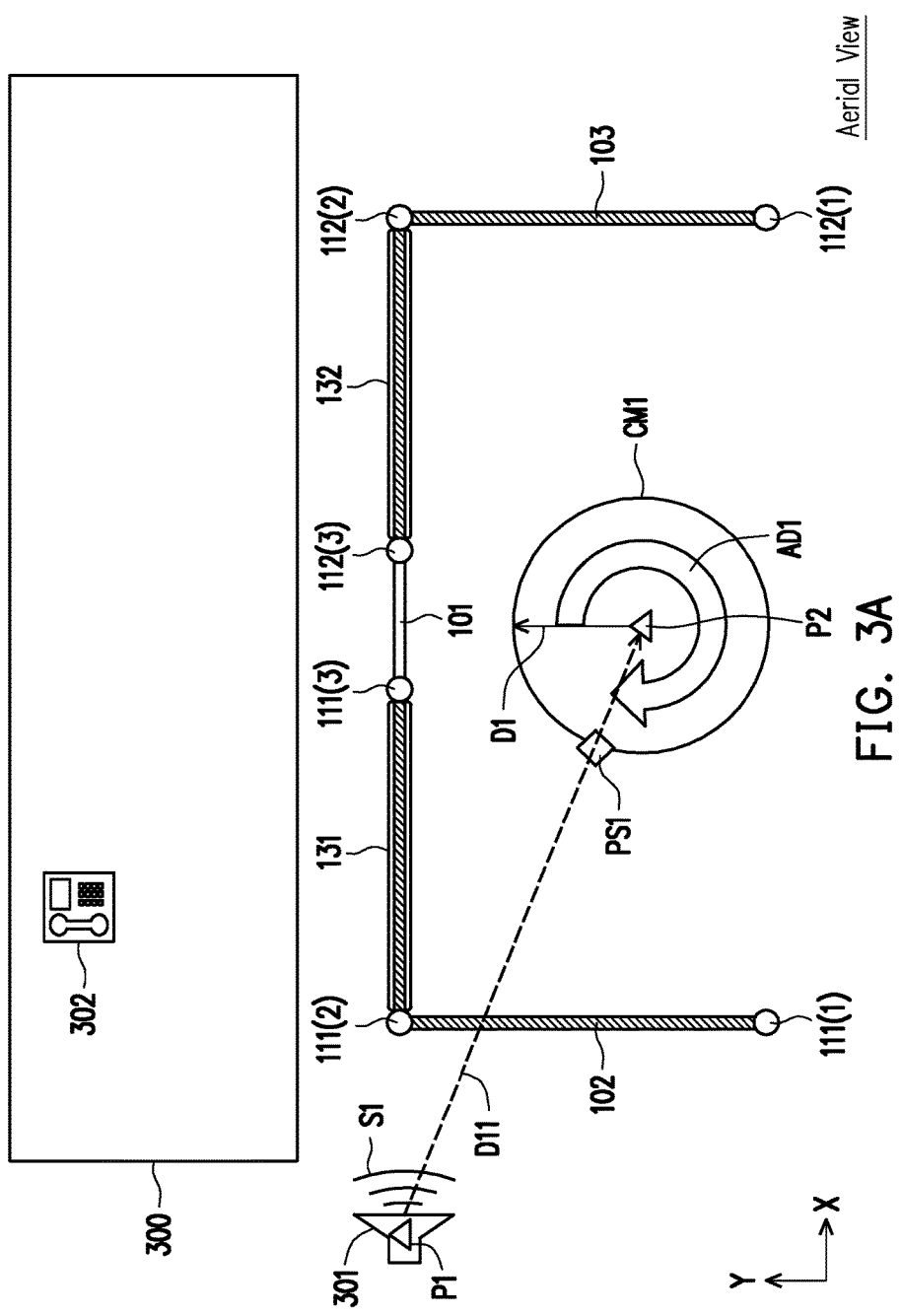
FIG. 3A shows an aerial view of a sound source out of a view-via-lens according to an embodiment of the invention.

Referring to FIG. 3A, for example, assuming that a wearer W1 wears the wearable electronic apparatus 10, a telephone 302 is on a table 300 in front of the wearable electronic apparatus, and the telephone 302 is seen by the wearer (the telephone 302 is within a range of the view seen through the lens 121 or lens 122); a speaker 301 making a sound S1 is on the left side of the wearable electronic apparatus 10, and the speaker 301 is not seen by the wearer (the speaker 301 is exceed a range of the view seen through the lens 121 or lens 122).

The sound receivers 111(1) to 111(5) and 112(1) to 112(5) receive the sound S1 and generate a plurality of audio data to the controller 130. The controller 130, according to the analyzing of the audio data, determines a relative direction D11 and a relative location of the position P1 of the speaker 301 and the position P2 of the reference point of the wearable electronic apparatus 10. For example, if the coordinate of the position P2 of the reference point of the wearable electronic apparatus is (0, 0, 0), the coordinate of the relative location of the speaker and the wearable would be the coordinate of the position P1.

In the embodiment, the controller 130 determines whether the speaker 301 is within the view-via-lens according to the relative direction D11 and the relative location. Specifically, referring to FIG. 3C, the processor 131 may determine a first range of the relative direction (in X-Y plane) corresponding to boundary B1 and B2 of the view-via-lens VL1, and a second range of the relative direction (in Y-Z plane) corresponding to boundary B3 and B4 of the view-via-lens VL1 by, for example, performing a calibration procedure with the eyes of the wearer. Then, the processor 131 may determine whether the image of the speaker 301 is within the view-via-lens VL1 by determining whether the relative direction D11 in X-Y plane is within the first range. In the case of FIG. 3A, the relative direction D11 is determined as being not within the first range, and the processor 131 determines that the image of the speaker 301 is not in the view-via-lens VL1 (the speaker 301 is determined that being not within the view-via-lens VL1). That is, the processor 131 determines that the wearer cannot see the speaker 301 through the lenses.

Furthermore, the controller 130 also determines a corresponding azimuth angle AD1 between the sound source and the wearable electronic apparatus according to the relative direction. A corresponding azimuth angle of the direction D1 is zero degree.

For example, according to the relative direction D11, the controller 130 may determine a corresponding azimuth angle AD1 between the speaker 301 and the wearable electronic apparatus 10 by identifying a point PS1 at which the relative direction D11 is crossing the circle CM1 centered at the position P2 of the reference point of the wearable electronic apparatus 10, and determining the azimuth angle AD1 in X-Y plane (2D plane) according to the point PS1. The azimuth angle AD1 indicates a direction where the sound S1 comes from in X-Y plane.

In the embodiment, if the sound source is determined that being not within the view-via-lens according to the relative direction and the relative location, the controller generates a first computer-generated visual content corresponding to the sound which indicates the intensity level of the sound and the relative direction, and the display device displays the first computer-generated visual content on the lens.

Figure 3B:
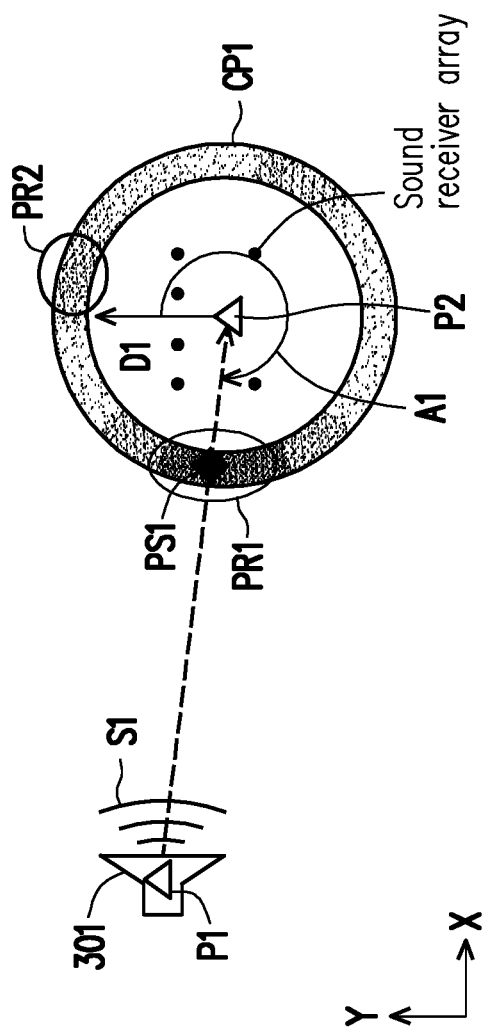
FIG. 3B shows schematic diagram of generating a first computer-generated visual content corresponding to a sound of the sound source in FIG. 3A according to an embodiment of the invention.

Referring to FIG. 3B, following the example of FIG. 3A, the speaker 301 is determined that being not within the view-via-lens VL1, and the processor 131 may generate the first computer-generated visual content corresponding to the sound S1, wherein the first computer-generated visual content may be a circle pattern CP1, and the color of a plurality of pieces (respectively correspond to different angles of the circle pattern) are determined according to intensity level of the sound coming from a direction corresponding to the plurality of pieces. In the following description, the plurality of pieces may also be referred to as regions. For example, the center of a region PR1 of one piece corresponding to the speaker 301 (sound source) is decided as the cross-point of the relative direction D11 and the circle CM1 centered at the position P2 of the reference point of the wearable electronic apparatus 10, and the color of the region PR1 is determined according to the intensity level of the sound S1 coining from the speaker 301. The color (second color) of region PR2 (pieces PR2) of the circle pattern CP1 is different from the color (first color) of the region PR1 (pieces PR1) of the circle pattern CP1 since the intensity level of the sounds respectively corresponding to the pieces PR2 and PR1 are different. In other words, the processor 131 setting the position of the region of the piece corresponding to the speaker by deciding the angle A1 of the center of the region (or the piece) corresponding to the sound source (or the sound) in the circle pattern as being the same as the corresponding azimuth angle AD1. Therefore, a piece having a first color (corresponding to a first intensity level) and a first angle of the circle pattern represents that a sound having the first intensity level of the sound is coming from a direction of which the azimuth angle of the sound source is the same as the first angle. In an embodiment, the processor 131 may add a sound mark PS1 corresponding to the sound in the circle pattern CP1, and the position, the color or/and the size of the sound mark PS1 may be determined according to the acoustic properties (e.g., intensity level, relative direction) of the sound. If several audio sources are detected, several sound mark (e.g., PS1) marks would be added at a particular region (e.g., PR1, PR2) of the circle pattern CP1, accordingly.

In the embodiment, the first computer-generated visual content includes an arrow pattern, wherein a color or a size of the arrow pattern is determined by the controller according to the intensity level of the sound, wherein a slope of the arrow pattern is determined by the controller according to the relative direction, wherein the arrow pattern is rendered as pointing at a side of the view-via-lens, wherein the side is determined by the controller, and the side is the same as a side of which the sound source relative to the wearable electronic apparatus.

Figure 3C:
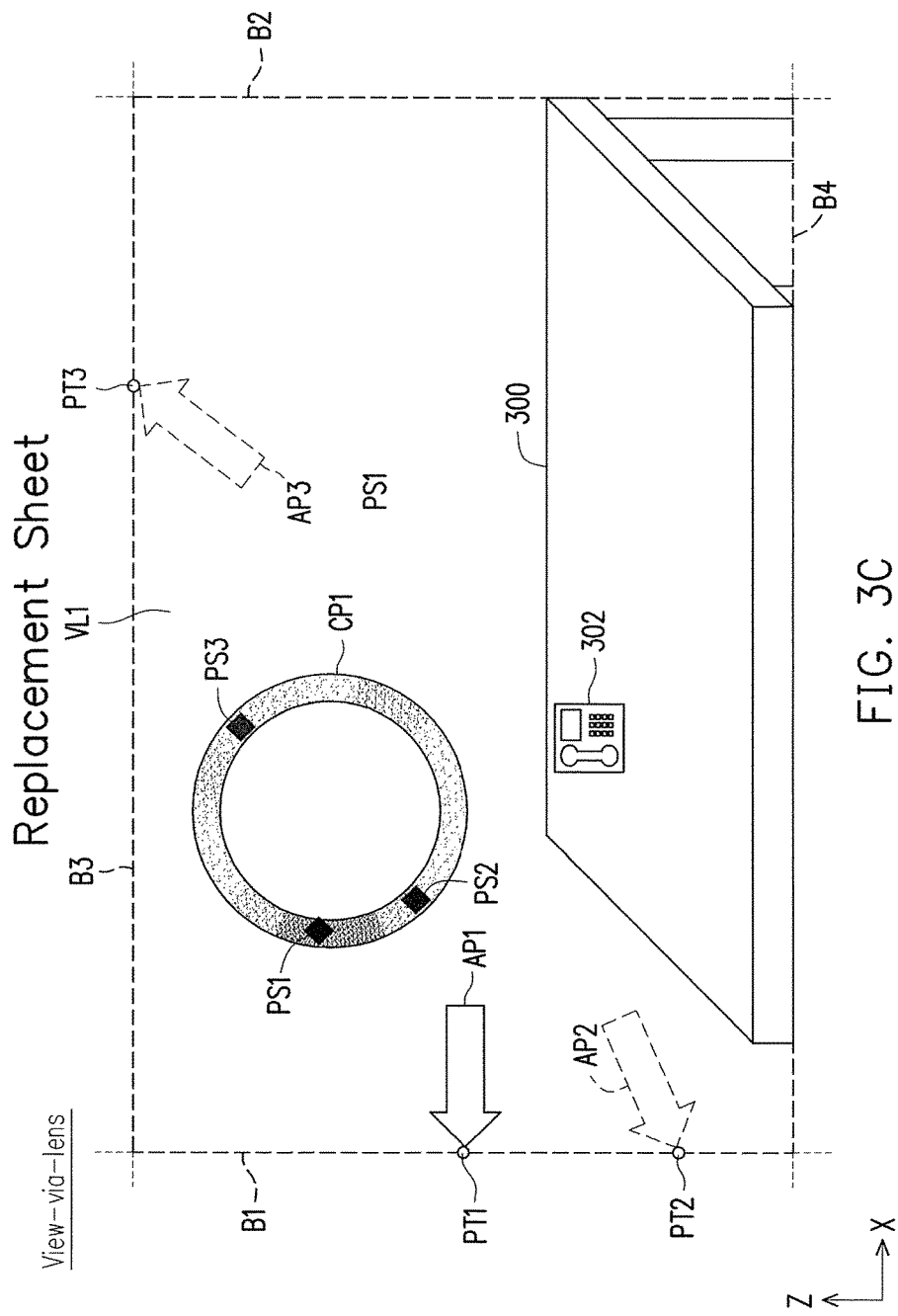
FIG. 3C shows a schematic diagram of a view-via-lens having first computer-generated visual contents according to an embodiment of the invention.
Figure 3E:
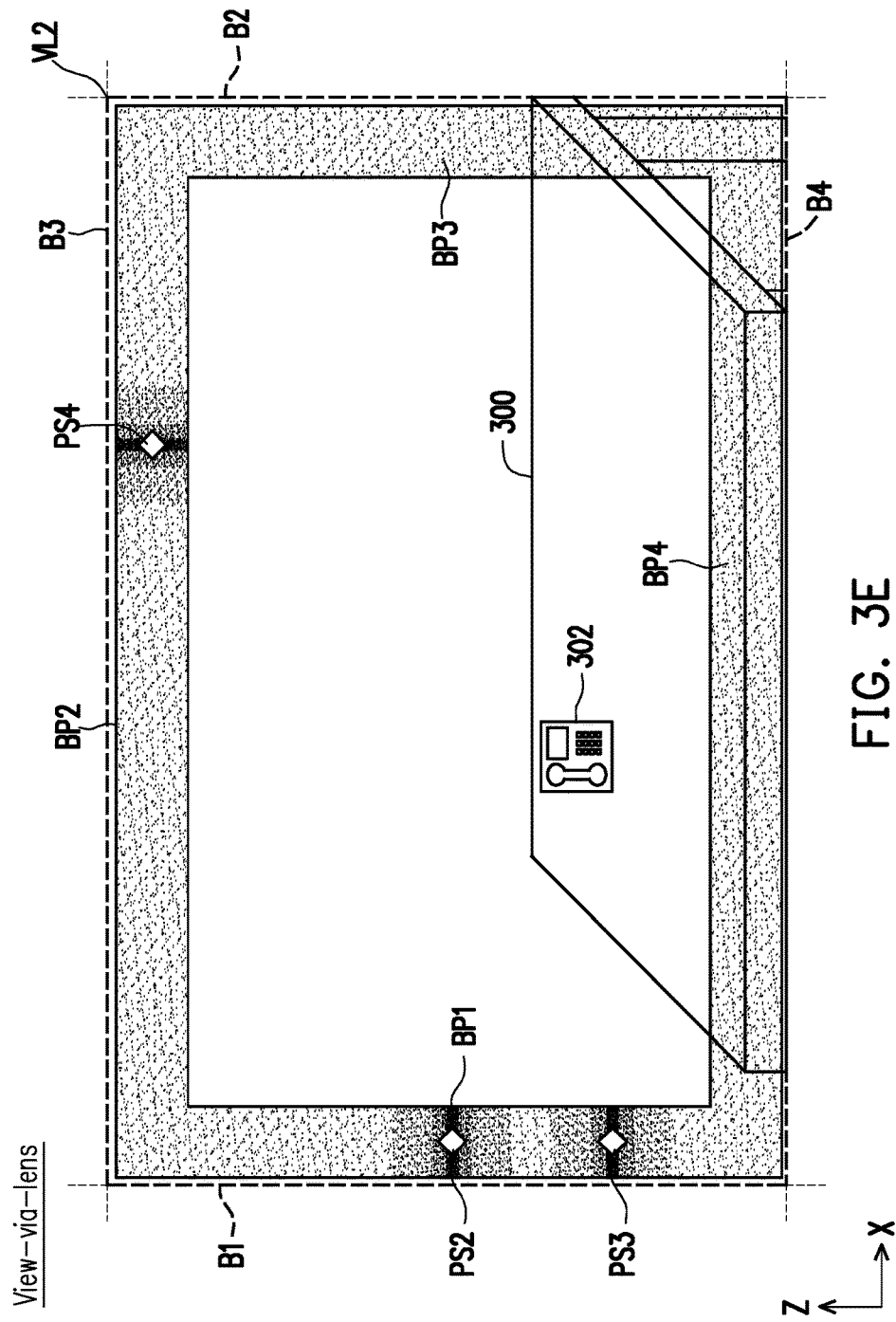
FIG. 3E shows a schematic diagram of a view-via-lens having first computer-generated visual contents according to an embodiment of the invention.

For example, referring to FIG. 3C, assuming the real-world scene of the view-via-lens VL1 shows the telephone 302 is on the table 300, and view-via-lens VL1 further includes an arrow pattern AP1 which is a graphical pattern of the first computer-generated visual content that is utilized for indicating a sound source outside of the view-via lens VL1.

It should be noted that the embodiment illustrated in FIG. 3C includes the computer-generated visual contents to represent sounds coming from all directions. This would be a three-dimensional representation of the sound imaging. In addition to the arrow patterns AP1, AP2, AP3, the circle pattern CP1 illustrated in FIG. 3B may also be displayed. The circle pattern CP1 indicates the azimuth angle of each sound source with respect to the X-Y plane while the slope of the arrow patterns AP1, AP2, AP3 indicate an elevation angle (also known as altitude angle) of each detected sound source with respect to the X-Z plane. The points PS1, PS2, PS3 on the circle pattern CP1 respectively correspond to the points PT1, PT2, PT3 at the tip of the arrow patterns AP1, AP2, AP3. In other words, the circle pattern CP1 and the arrow pattern AP1, AP2, AP3 displays the sound imaging in a three-dimensional manner.

Specifically, the speaker 301 of the sound S1 is determined that not being within the view-via-lens VL1, and the processor 131 start to generate the arrow pattern AP1 as the first computer-generated visual content. First, the processor 131 determines the size or the color of the arrow pattern AP1 according to the intensity level of the sound S1 (e.g., the bigger size corresponds a larger intensity level, or the darker color corresponds a larger intensity level). Next, the processor 131 determines the side of the speaker 301 according to the relative direction or relative location of the speaker 301 and the wearable electronic apparatus 10, and the determined side is a side at which the arrow pattern AP1 points in the view-via-lens VL1.

In an embodiment, the processor 131 determines the slope of the arrow pattern AP1 according to the relative direction (in Y-Z plane) of the speaker, that is an elevation angle with respect to the wearable electronic apparatus. For example, the slope of the arrow pattern AP1 is zero, it indicates the speaker 301 has the same height of the wearable electronic apparatus.

In an embodiment, the position of the point at which the arrow pattern points and the slope of the arrow pattern may help to indicate a direction where the corresponding sound is coming from. For example, an arrow pattern AP2 points at a point PT2 located with a height below the middle of the left side, it indicates that a sound is coming from a sound source located at a height lower than the height of the wearable electronic apparatus. Furthermore, according to the slope (which is determined according to the determined corresponding azimuth angle between the sound source of arrow pattern AP2 and the wearable electronic apparatus) of the arrow pattern AP2, the sound source of the sound corresponding to the arrow pattern AP2 is coming from left-bottom side of the wearable electronic apparatus (extending along the slope of arrow pattern AP3 will reach the center of view-via-lens VL1, and the azimuth angle may be obtained, wherein the azimuth angle represent a relative azimuth angle between the sound source and the wearable electronic apparatus). In another embodiment, the arrow pattern AP3 indicates that a corresponding sound is coming from the top-right side of the wearable electronic apparatus. Position of sound source of arrow pattern AP4 is out of the range of the view-via-lens VL1 (e.g., in a space above the head of wearer, and the space is out of the sight).

In the embodiment, the first computer-generated visual content also includes a bar pattern, wherein, similar to the circle pattern, a color of a piece of the bar pattern is determined by the controller according to the intensity level of the sound, the bar pattern would be rendered near a side of the view-via-lens, wherein the side is determined by the controller, and the side is the same as a side of which the sound source relative to the wearable electronic apparatus.

FIG. 3D shows schematic diagram of generating another first computer-generated visual content corresponding to the sound of the sound source in FIG. 3A according to an embodiment of the invention.

In the embodiment, relationship between the wearer and the sound source in height may be determined and shown by the processor 131. Referring to FIG. 3D, the processor 131 may determine the position of a sound mark PS5 for representing the sound S1 by determining the height H1 in a bar pattern BP1 according to the relative direction D11 in X-Z plane. In this case, the position of the sound mark PS5 for representing the sound S1 is determined to locate at the middle of the bar pattern BP1 since the height H1 is determined as the same as the height H2. In another example, the position of a piece for representing the corresponding sound is determined to locate at the lower part of the bar pattern if the height of the sound is determined as being lower than the height of the wearable electronic apparatus. In further another example, the position of a piece for representing the corresponding sound is determined to locate at the upper part of the bar pattern if the height of the sound is determined as being higher than the height of the wearable electronic apparatus.

In the embodiment, the processor 131 may generate four bar patterns respectively on the four sides around the view-via-lens VL2. Referring FIG. 3E, the speaker 301 is determined that being not within the view-via-lens VL1, and the processor 131 may display a bar pattern BP1 and display the sound mark PS2 as the first computer-generated visual content corresponding to the sound S1. The processor 131 determines that the height H1 of the speaker 301 is the same as the height H2 of the reference point of the wearable electronic apparatus according to the relative direction D11, and the darker color piece locating at the middle of the bar pattern BP1 rendered near the left side of the view-via-lens VL2 indicates that the speaker 301 of the sound S1 is locating on the left side of the wearable electronic apparatus and the height of the speaker 301 is the same as the wearable electronic apparatus. In another example, the two darker color pieces locating at the bar pattern BP2 rendered near the top side of the view-via-lens VL2 indicates that two corresponding sounds are coming respectively from the top-left side and the top-right side of the wearable electronic apparatus. The processor 131 may add corresponding sound mark on the bar pattern (e.g., the sound marks PS2, PS3 and PS4). In an embodiment, the bar patterns BP3 or BP4 may also be displayed on the left and bottom sides of the view-via-lens VL2, respectively. However, the disclosure is not intended to limit the displaying of the bar patterns, the bar patterns BP1, BP2, BP3, or BP4 may only be displayed or generated when there is a sound source being detected.

Figure 4A:
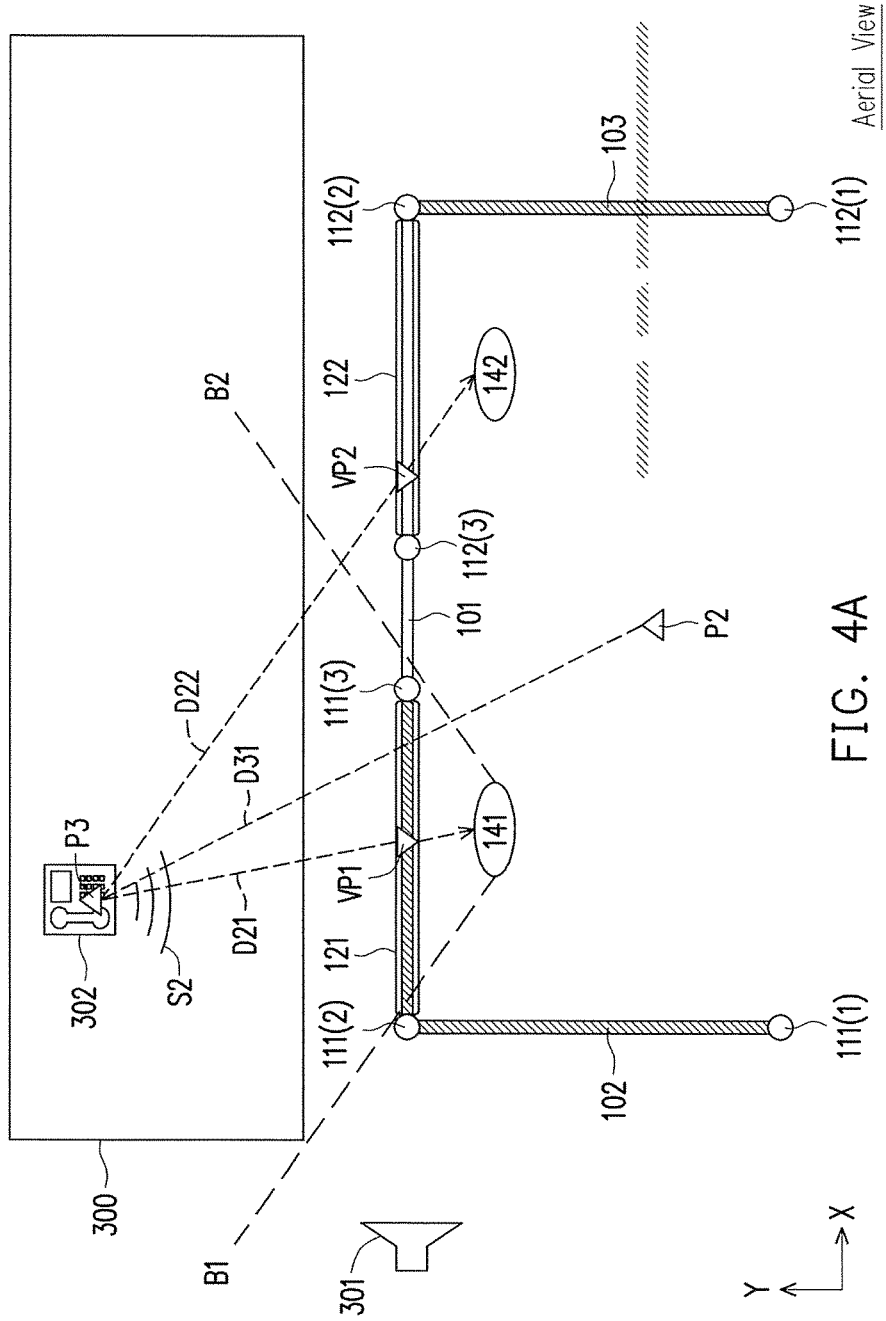
FIG. 4A shows an aerial view of a sound source in a view-via-lens according to an embodiment of the invention.

Referring to FIG. 4A, similar to the example in FIG. 3A, assuming that a telephone 302 making sound S2 is on a table 300 in front of the wearable electronic apparatus, and the telephone 302 and the table 300 are seen by the wearer (e.g., the real-world scene of the view-via-lens would show the telephone on the table); a speaker 301 making no sound is on the left side of the wearable electronic apparatus 10, and the speaker 301 is not seen by the wearer (the speaker 301 is exceed a range of the view seen through the lens 121 or lens 122).

The sound receivers 111(1) to 111(5) and 112(1) to 112(5) receive the sound S2 and generate a plurality of audio data corresponding to the sound S2 to the controller 130. The controller 130, according to the analyzing of the audio data, determines a relative direction D31 and a relative location of the position P3 of the telephone 302 and the position P2 of the reference point of the wearable electronic apparatus 10.

In the embodiment, the controller 130 determines whether the sound S2's sound source (the telephone 302) is within the view-via-lens according to the relative direction D31 and the relative location P3. In more detail, referring to FIG. 4A, the processor 131 may calculate a relative direction D21 for position P3 and a position of a reference point 141 corresponding to the lens 121 and a relative direction D22 for position P3 and a position of a reference point 142 corresponding to lens 122 according to the relative direction D31 and the relative position of reference points P2, 141 and 142. The position of the reference point 141, for example, may be the position on which the view-via-lens is captured by a visual conception of wearer's left eye; and the position of the reference point 142 may be the position on which the view-via-lens is captured by a visual conception of wearer's right eye. In another embodiment, the position of the reference points 141, 142 may be referred to as the position of an imaging planes respectively corresponding to the lenses. For example, the computer-generated visual content displayed on the lens 121 and the real-world scene which is seen through the lens 121 are captured on the imaging plane corresponding to the lens 121.

Take the left side lens 121 as the example, similar to the foregoing description, the processor 131 determines a first range (horizontal range) of the relative direction (in X-Y plane) corresponding to boundary B1 and B2 of the view-via-lens corresponding to the lens 121 and the reference point 141, and a second range (vertical range) of the relative direction (in Y-Z plane) corresponding to boundary B3 and B4 of the view-via-lens corresponding to lens 121. Then, the processor 131 may determine whether the image of the telephone 302 is within the view-via-lens VL3 by determining whether the relative direction D21 in X-Y plane is within the horizontal range or by determining whether the relative direction D21 in vertical plane of the orthogonal coordinate system is within the vertical range. In the case of FIG. 4A, the relative direction D21 is determined as being within the horizontal range, and the processor 131 determines that the image of the telephone 301 is in the view-via-lens VL3 corresponding to lens 121 (the telephone 302 is determined that being within the view-via-lens VL3). In an embodiment, the processor may confirm/determine whether the image of the telephone 302 is within the view-via-lens VL3 by determining whether the relative location of the telephone 302 and wearable electronic apparatus is in a virtual viewing space (corresponding to the lens 121) in which every location would be determined as being within the view-via-lens VL3 (corresponding to lens 121).

In the embodiment, if the sound source is determined that being within the view-via-lens according to the relative direction and the relative location, the second computer-generated visual content corresponding to the sound includes a sound source pattern, wherein a color or a size of the sound source pattern is determined according to the intensity level of the sound, wherein the controller determines a virtual coordinate corresponding to the sound source in the view-via-lens according to the relative location and the relative direction of the sound source corresponding to the wearable electronic apparatus, wherein the display device displays the second computer-generated visual content on the lens by rendering the second computer-generated visual content on the virtual coordinate of the lens, such that the second computer-generated visual content is rendered on the position of the sound source in the view-via-lens.

For example, according to the relative direction D21 and the relative location of the position P3 and the position of the reference point 141, the processor 131 may calculate a virtual coordinate corresponding to the telephone 302 in the view-via-lens VL3 of the lens 121. This virtual coordinate is a coordinate of a virtual point VP1 at which the relative direction D21 cross the lens 121 from the position P3 to the position of reference point 141 (the view-via-lens VL3 is captured by a visual conception of wearer's left eye on the position of the reference point 141). In other words, the virtual point VP1 represents the center of the image of the telephone 302 in the view-via-lens VL3 of the lens 121. The determined (calculated) virtual coordinate corresponding to the telephone 302 in the view-via-lens VL3 of the lens 121 is used for displaying the second computer-generated visual content corresponding to the sound S2 on the lens 121. Similarly, the virtual point VP2 represents the center of the image of the telephone 302 in the view-via-lens of the lens 122, and the corresponding virtual coordinate is used for displaying the second computer-generated visual content corresponding to the sound S2 on the lens 122.

Figure 4B:
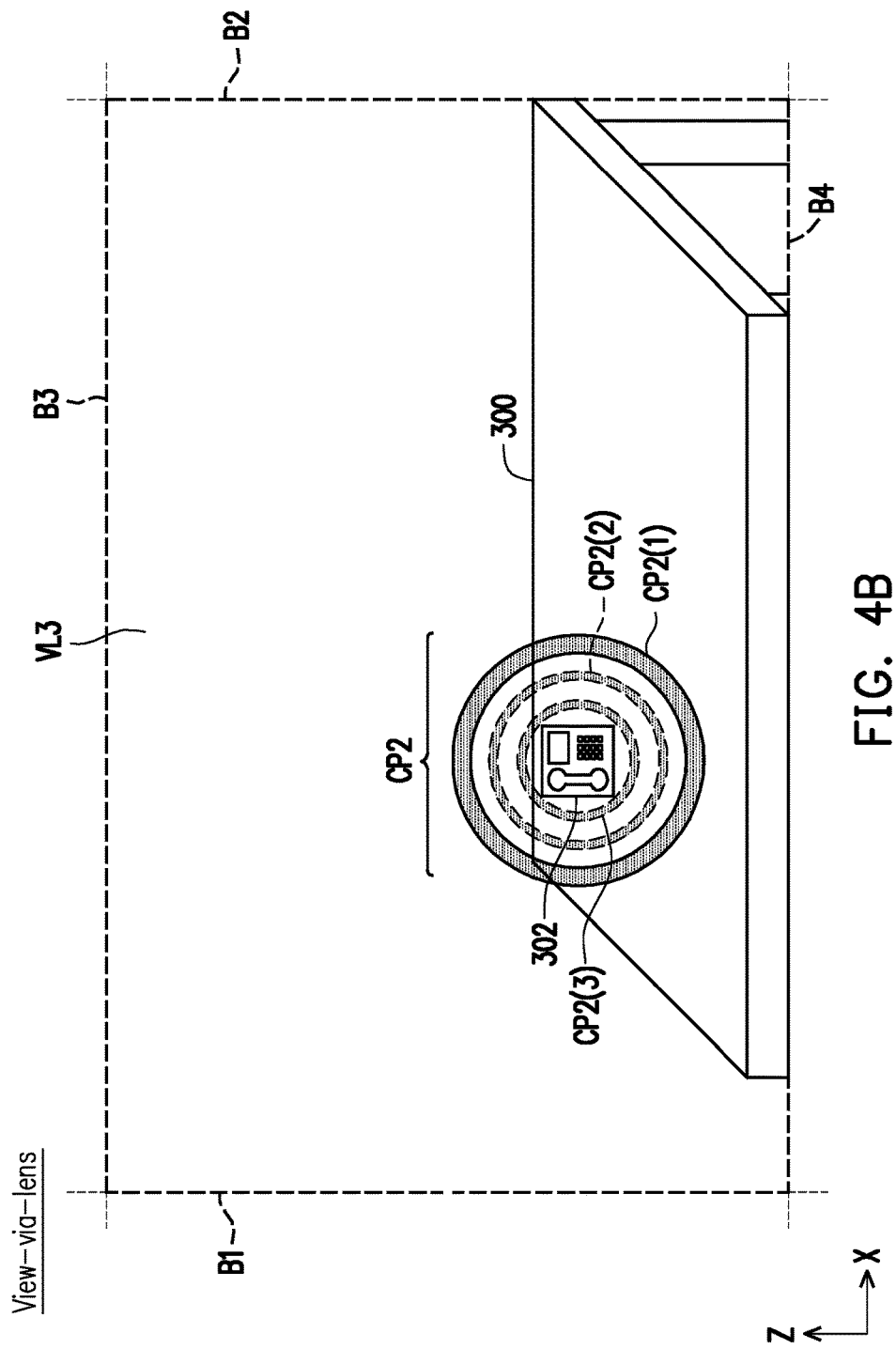
FIG. 4B shows a schematic diagram of a view-via-lens having a second computer-generated visual content according to an embodiment of the invention.
Figure 4C:
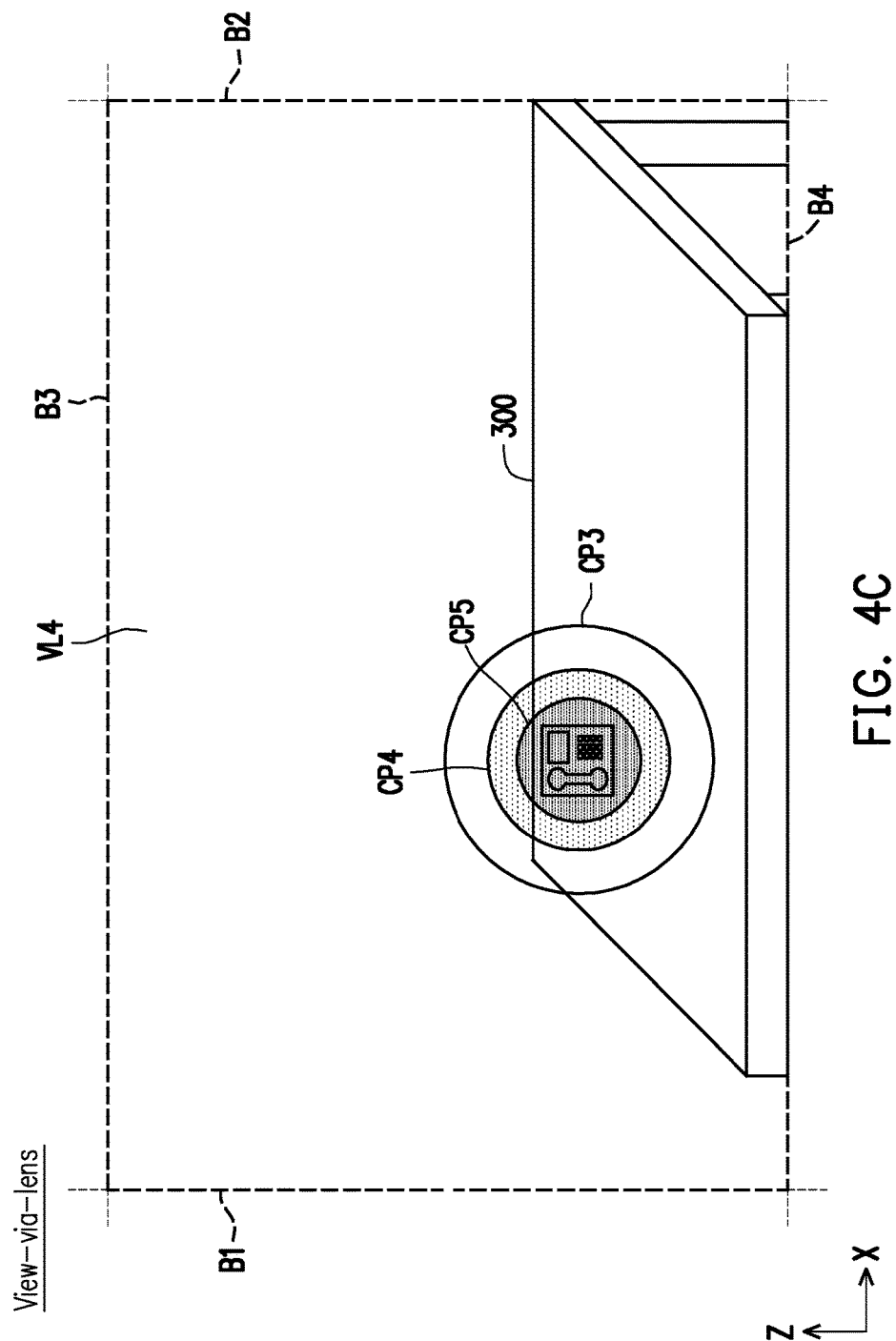
FIG. 4C shows a schematic diagram of a view-via-lens a second computer-generated visual content according to an embodiment of the invention.

Referring to FIG. 4B, following the example of FIG. 4A, the telephone 302 now is determined that being within the view-via-lens VL3, and the processor 131 may generate the second computer-generated visual content corresponding to the sound S2, wherein the second computer-generated visual content may be a sound source pattern CP2. In the embodiment, the sound source pattern may be one or more circle patterns, and the color or/and the size thereof may be determined according to intensity level of the sound S2. As illustrated in FIG. 4B, the real-world scene of the view-via-lens VL3 shows the telephone 302 is on the table 300, and view-via-lens VL3 further includes a sound source pattern CP2 (e.g., circle patterns CP2(1), CP2(2) and CP2(3)) which is rendered on the position of the image of telephone 302 in the real-world scene (in the view-via-lens VL3). In an embodiment, the strength of the sound corresponding to the sound pattern CP2 may be indicated by the number of the circle patterns of the sound source pattern CP2 (more circles indicates greater sound strength). In another embodiment, the strength of the sound (sound strength) corresponding to the sound pattern CP2 may be indicated by color of the circle patterns according to a preset color map.

In the embodiment, the preset colormap is a Jet colormap, and a plurality of colors among the Jet colormap may be sequentially corresponded to a plurality of ranges of sound strength, so as to map a sound strength of a sound to a color of the Jet colormap. It should be noted that the present invention is not limited thereto, for example, in another embodiment, the preset colormap may be any suitable colormap, such as HSV colormap, Cool colormap, Gray colormap, Hot colormap, Cool colormap, Lines colormap, etc.

The invention is not limited to the shape of the sound source pattern. For example, referring to FIG. 4C, the view-via-lens VL4 includes a sound source pattern which is a plurality of circular area CP3, CP4 and CP5 respectively having different colors and sizes. Furthermore, in an embodiment, the processor 131 may blend a plurality of sound source patterns respectively corresponding to a plurality of sounds as a sound source pattern having an irregular shape with different colored regions representing different intensity of the sounds. Furthermore, as mentioned above, the colors of the circular areas CP3, CP4 and CP5 are decided according to the preset colormap. For example, when the colors of the circular areas CP3, CP4 and CP5 are determined according to the Jet colormap, the processor 131 may map the sound strength of the sound source to the Jet colormap to determine the colors of the circular areas CP3, CP4 and CP5.

Figure 5A:
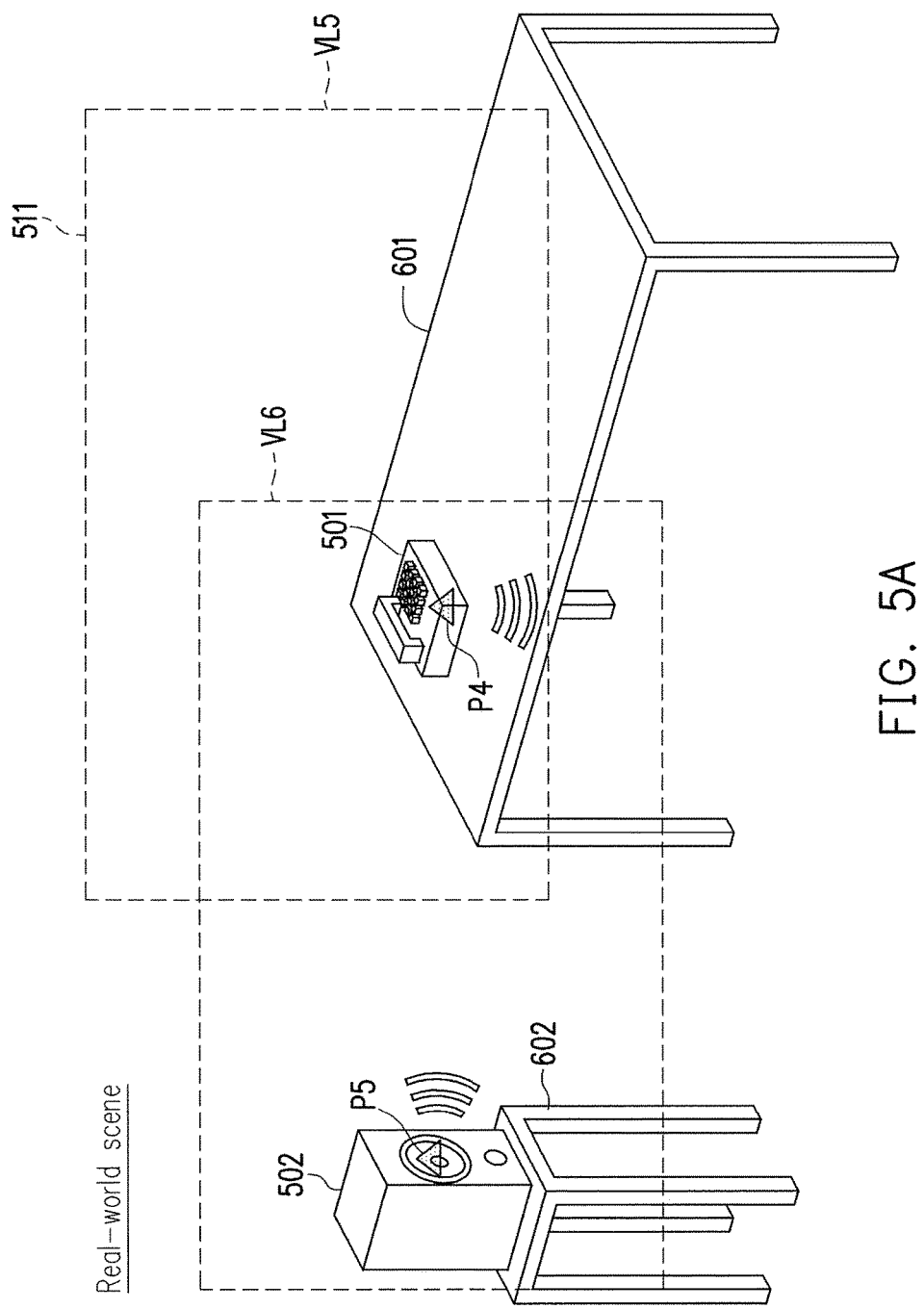
FIG. 5A shows a schematic diagram of a real-world scene according to an embodiment of the invention.

Referring to FIG. 5A, the background image is illustrated as a scene of real world in front of the wearable electronic apparatus, and the scene is similar to the example illustrated in FIGS. 3A and 3C. Referring to FIG. 5A, the scene 511 of real-world shows that, in front of the wearable electronic apparatus, a telephone 501 is on a table 601 on the right-front side of the wearer, and a speaker 502 is on a table 602 on the left-front side of the wearer. It assuming that, the telephone and the speaker 502 are both making sounds, and the part of the scene of real world is captured as the real-world scene in the view-via-lens VL5. The controller 130 may determine the relative location P4 and P5 of the telephone 501 and speaker 502 according to their sounds. Furthermore, the telephone 501 and the table 601 are seen by the wearer (the telephone 501 is within a range of the view seen through the lens 121 or lens 122).

Referring to FIG. 5B, the controller 130 may determine one sound source 501 is within the view-via-lens VL5, and another sound source 502 is not within the view-via-lens VL5. And, the controller 130 accordingly generates computer-generated visual contents CP6 and AP4 as illustrated in FIG. 5B. As the foregoing description, the two computer-generated contents provide information that two sounds are around the wearable electronic apparatus, one is coming from a source within the view-via-lens, and another is coming from a source not within the view-via-lens. And, the first computer-generated visual content CP6 indicates that a sound source of sound corresponding to the first computer-generated visual content CP6 is located at the position of the first computer-generated visual content CP6 in the real world. The second computer-generated visual content AP4 indicates that another sound source of sound corresponding to the second computer-generated visual content AP4 is located at the left side of the wearable electronic apparatus in the real world. If the wearable electronic apparatus is turned left, the image of the other sound source maybe captured in the view-via-lens VL6 which is different from the view-via-lens VL5.

Referring back to FIG. 5A, assuming that another part of the scene of real world is captured as the real-world scene in the view-via-lens VL6. The controller 130 may determine the relative location P4 and P5 of the telephone 501 and speaker 502 according to their sounds. As shown in FIG. 5A, the telephone 501 and the speaker 502 are within the view-via-lens VL6.

Figure 5C:
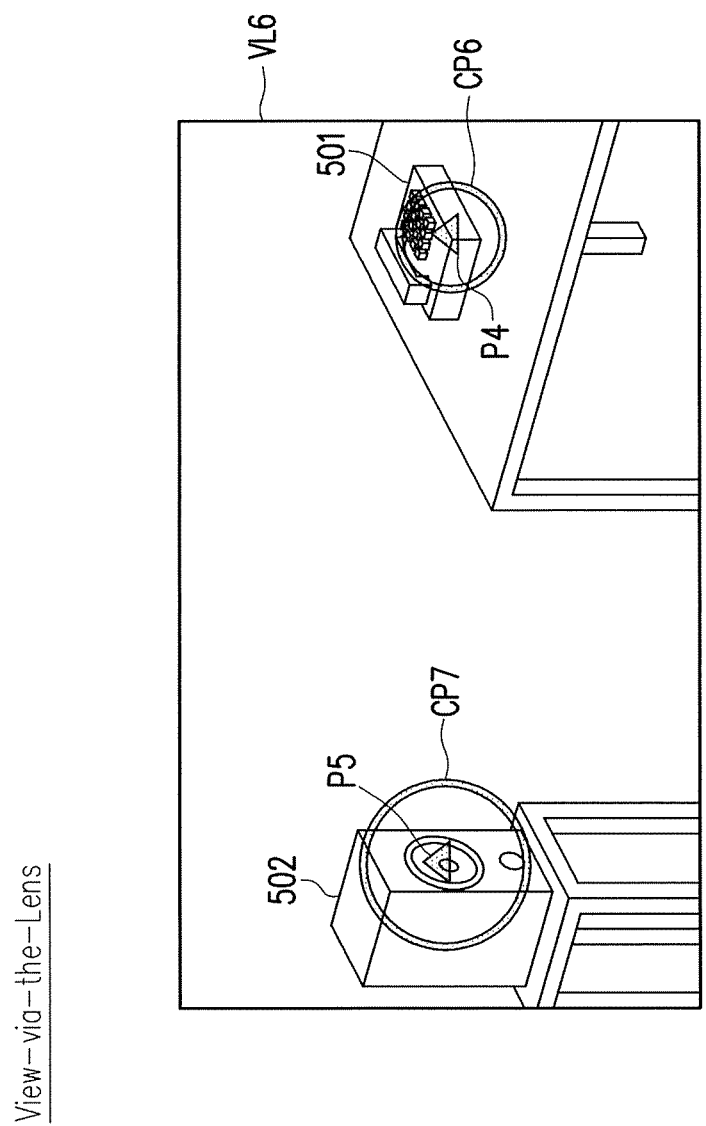
FIG. 5C shows a schematic diagram of a view-via-lens having second computer-generated visual contents respectively corresponding to the different sounds according to an embodiment of the invention.

Referring to FIG. 5C, the controller 130 may determine two sound sources 501 and 502 are within the view-via-lens VL6, and the controller 130 accordingly generates second computer-generated visual contents CP6 and CP7 as illustrated in FIG. 5C respectively on the position P4 and P5.

Based on the foregoing embodiment, the provided wearable electronic apparatus, computer-implement operating method for the same, and the electronic system are capable of receiving a sound which is made by a nearby sound source, analyzing audio data corresponding to the received sound, and accordingly generating and displaying an acoustic image corresponding to a received sound, so as to informing an intensity of the sound and a relative direction/position of the sound through the acoustic image (the computer-generated visual content) displayed on the view-via-lens or the captured image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wearable electronic apparatus, comprising: a front frame; a side frame; a transparent lens with a display surface, disposed on the front frame, having a view-via-lens viewed from one side of the transparent lens; wherein the view-via-lens comprises a computer-generated visual content displayed on the transparent lens and a real-world scene seen by a wearer through the transparent lens; a sound receiver array, disposed on the front frame and the side frame, receiving sound of surrounding area, and generating a plurality of audio data according to the received sound; and a controller, coupled to the transparent lens and the sound receiver array, configured to analyze the audio data to determine a relative location of a sound source with respect to the wearable electronic apparatus, generate a visual content representing the sound based at least in part on the relative location, and display the visual content on the display surface of the transparent lens to overlap the view-via-lens.

2. The wearable electronic apparatus according to claim 1, wherein the controller is further configured to generate the visual content representing the sound having an intensity level greater than an intensity threshold.

3. The wearable electronic apparatus according to claim 1, wherein the controller further configured to use an audio filter to prevent the generated audio data from being influenced by a voice of the wearer and a spatial aliasing.

4. The wearable electronic apparatus according to claim 1, wherein a plurality of first sound receivers among the sound receiver array are distributed on the front frame around the transparent lens, and a plurality of second sound receivers among the sound receiver array are distributed on the side frame.

5. The wearable electronic apparatus according to claim 1, wherein when the sound source is determined to be not within the view-via-lens according to the relative location, the controller generates a first visual content indicating an intensity level of the sound and a relative direction, and displays the first visual content on the display surface of the transparent lens,
wherein when the sound source is determined to be within the view-via-lens according to the relative location, the controller generates a second visual content indicating the intensity level of the sound, and displays the second visual content on the display surface of the transparent lens by rendering the second visual content at a position of the sound source in the view-via-lens.

6. The wearable electronic apparatus according to claim 5, wherein the first visual content representing the sound comprises:
an arrow pattern, having a color and/or a size which is determined according to the intensity level of the sound, and a slope of the arrow pattern is determined according to the relative location,
wherein the arrow pattern is rendered as pointing toward a side of the view-via-lens indicating a position of the sound source relative to the wearable electronic apparatus.

7. The wearable electronic apparatus according to claim 5, wherein when the sound source is determined to be not within the view-via-lens, the first visual content representing the sound comprises:
a circle pattern, wherein a first piece among a plurality of pieces corresponding to different angles of the circle pattern corresponds the sound,
wherein a color of the first piece is determined according to the intensity level of the sound, wherein an angle of the first piece of the circle pattern indicates a corresponding azimuth angle between the sound source and the wearable electronic apparatus.

8. The wearable electronic apparatus according to claim 5, wherein when the sound source is determined to be within the view-via-lens, the second visual content corresponding to the sound comprises:
a sound source pattern, having a color and/or a size determined according to the intensity level of the sound,
wherein the controller determines a virtual coordinate of the sound source within the view-via-lens according to the relative location of the sound source,
wherein the controller renders the second visual content on the display surface of the transparent lens based on the virtual coordinate, wherein the second visual content is rendered at a position of the sound source within the view-via-lens.

9. A computer-implement operating method, adapted to an electronic apparatus having a controller, a sound receiver array and a transparent lens having a display surface, comprising: receiving, by the sound receiver array, a sound made by a sound source in an area surrounding the electronic apparatus, and generating a plurality of audio data according to the received sound: analyzing, by the controller, the plurality of audio data to determine a relative location of the sound source with respect to the electronic apparatus; generating, by the controller, a visual content representing the sound based at least in part on the relative location; and rendering the generated visual content representing the sound on the display surface of the transparent lens having a view-via-lens viewed from one side of the transparent lens, wherein the view-via-lens comprises a computer-generated visual content displayed on the transparent lens and a real-world scene seen by a wearer through the transparent lens; and the visual content is rendered over the view-via-lens.

10. The computer-implement operating method according to claim 9, wherein the step of generating the visual content representing the sound comprises:
generating, by the controller, the visual content representing the sound having an intensity level is greater than an intensity threshold.

11. The computer-implement operating method according to claim 9, wherein the step of generating the visual content representing the sound comprises:
using, by the controller, an audio filter to prevent the generated audio data from being influenced by a voice of the wearer and a spatial aliasing.

12. The computer-implement operating method according to claim 9,
wherein when the sound source is determined to be not within the view-via-lens according to the relative location, the step of generating the computer-generated visual content representing the sound comprises:
generating, by the controller, a first visual content representing the sound which indicates an intensity level of the sound and a relative direction,
wherein the step of rendering the visual content representing the sound on the display surface of the transparent lens comprises:
rendering the first visual content representing the sound of the sound source being not within the view-via-lens on the display surface of the transparent lens.

13. The computer-implement operating method according to claim 12, wherein the first visual content representing the sound comprises:
an arrow pattern, having a color and/or a size which is determined according to the intensity level of the sound, and a slope of the arrow pattern is determined according to the relative direction,
wherein the arrow pattern is rendered as pointing toward a side of the view-via-lens, which indicates a position of the sound source relative to the electronic apparatus.

14. The computer-implement operating method according to claim 12, wherein the first visual content representing the sound comprises:
a circle pattern, wherein a first piece among a plurality of pieces corresponding to different angles of the circle pattern corresponds the sound,
wherein a color of the first piece is determined, by the controller, according to the intensity level of the sound,
wherein an angle of the first piece of the circle pattern indicates a corresponding azimuth angle between the sound source and the wearable electronic apparatus.

15. The computer-implement operating method according to claim 9, wherein when the sound source is determined to be within the view-via-lens according to the result of the analysis, the step of generating the visual content representing the sound comprises:
generating, by the controller, a second visual content representing the sound determined to be within the view-via-lens,
wherein the step of rendering the generated visual content representing the sound on the display surface of the transparent lens comprises:
rendering the second visual content on the display surface of the transparent lens at a position of the sound source in the view-via-lens.

16. The computer-implement operating method according to claim 15, wherein the second visual content representing the sound comprises a sound source pattern, having a color and/or a size determined according to the intensity level of the sound,
wherein the step of rendering the generated visual content representing the sound on the transparent lens comprises:
determining, by the controller, a virtual coordinate corresponding to the sound source within the view-via-lens according to the relative location of the sound source; and
rendering the sound source pattern on the display surface of the transparent lens at the virtual coordinate of the transparent lens, wherein the second visual content overlaps the sound source in the view-via-lens.

* * * * *